United States Patent
Song et al.

(10) Patent No.: US 11,423,815 B2
(45) Date of Patent: Aug. 23, 2022

(54) DISPLAY APPARATUS, CONTROL METHOD AND RECORDING MEDIUM THEREOF

(71) Applicant: SAMSUNG ELECTRONICS CO., LTD., Suwon-si (KR)

(72) Inventors: Anjin Song, Suwon-si (KR); Juyong Kim, Suwon-si (KR); Junho Song, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/266,019

(22) PCT Filed: Sep. 24, 2019

(86) PCT No.: PCT/KR2019/012405
§ 371 (c)(1),
(2) Date: Feb. 4, 2021

(87) PCT Pub. No.: WO2020/067701
PCT Pub. Date: Apr. 2, 2020

(65) Prior Publication Data
US 2021/0304648 A1   Sep. 30, 2021

(30) Foreign Application Priority Data
Sep. 27, 2018 (KR) .................... 10-2018-0114742

(51) Int. Cl.
*G09G 3/00* (2006.01)
*G06T 7/70* (2017.01)

(52) U.S. Cl.
CPC ............... *G09G 3/001* (2013.01); *G06T 7/70* (2017.01); *G06T 2207/30196* (2013.01);
(Continued)

(58) Field of Classification Search
CPC ............ G09G 3/001; G09G 2320/028; G09G 2320/066; G09G 2320/0666;
(Continued)

(56) References Cited

U.S. PATENT DOCUMENTS

| | | | |
|---|---|---|---|
| 6,931,596 B2 | 8/2005 | Gutta et al. | |
| 9,013,619 B2 | 4/2015 | Kim et al. | |
| 9,930,250 B2 | 3/2018 | Ho et al. | |

(Continued)

FOREIGN PATENT DOCUMENTS

| | | |
|---|---|---|
| KR | 10-0852664 B1 | 8/2008 |
| KR | 10-2015-0020920 A | 2/2015 |

(Continued)

OTHER PUBLICATIONS

International Search Report (PCT/ISA/210) dated Jan. 23, 2020 by the International Searching Authority in International Application No. PCT/KR2019/012405.

(Continued)

*Primary Examiner* — Antonio A Caschera
(74) *Attorney, Agent, or Firm* — Sughrue Mion, PLLC

(57) ABSTRACT

The disclosure relates to a display apparatus, a control method and a recording medium, the display apparatus including: a display; an information obtaining part; and a processor configured to: obtain an information on a plurality of viewing positions of a plurality of users regarding a screen of the display by the information obtaining part, identify a viewing position, on which a distribution is concentrated, among the plurality of viewing positions based on the obtained information, and control to compensate an image quality of an area corresponding to the identified viewing position among a plurality of areas of the screen based on a viewing angle at the identified viewing position.

13 Claims, 14 Drawing Sheets

(52) U.S. Cl.
CPC ............... *G09G 2320/028* (2013.01); *G09G 2320/066* (2013.01); *G09G 2320/0666* (2013.01); *G09G 2320/0673* (2013.01); *G09G 2320/0686* (2013.01)

(58) Field of Classification Search
CPC .............. G09G 2320/0673; G09G 2320/0686; G09G 2320/0285; G09G 2320/068; G06T 7/70; G06T 2207/30196; H04N 13/366; H04N 13/368; H04N 13/371
See application file for complete search history.

(56) References Cited

U.S. PATENT DOCUMENTS

| 2002/0149613 | A1  | 10/2002 | Gutta et al. |
| 2004/0201564 | A1  | 10/2004 | Sugino et al. |
| 2008/0238889 | A1* | 10/2008 | Thorne ............... G09G 5/00 345/204 |
| 2012/0062551 | A1  | 3/2012  | Lee et al. |
| 2013/0088420 | A1* | 4/2013  | Kang ............... G06F 3/013 345/156 |
| 2013/0148002 | A1  | 6/2013  | Kim et al. |
| 2015/0077569 | A1  | 3/2015  | Ho et al. |
| 2018/0164981 | A1* | 6/2018  | Park ............... H04N 5/57 |

FOREIGN PATENT DOCUMENTS

| KR | 10-2017-0118318 A | 10/2017 |
| WO | 02/071315 A2      | 9/2002  |
| WO | 2005/071656 A1    | 8/2005  |

OTHER PUBLICATIONS

Written Opinion(PCT/ISA/237) dated Jan. 23, 2020 by the International Searching Authority in International Application No. PCT/KR2019/012405.

\* cited by examiner

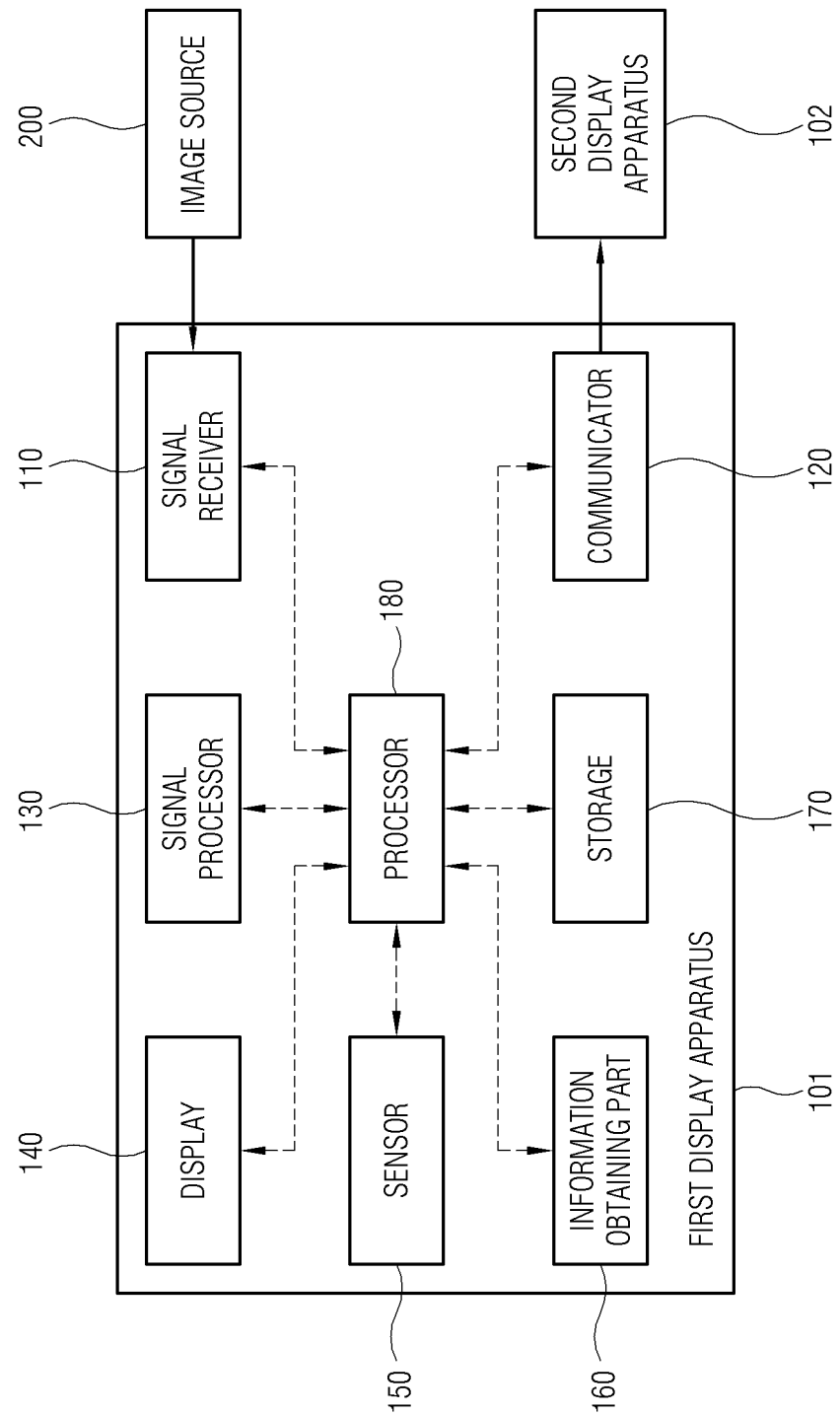

DISPLAY APPARATUS, CONTROL METHOD AND RECORDING MEDIUM THEREOF

TECHNICAL FIELD

The disclosure relates to a display apparatus, control method and a recording medium thereof, more specifically to a display apparatus, control method and a recording medium to compensate an image quality based on information.

BACKGROUND ART

A display apparatus that displays an image of a content which is received from an external image source or is stored in the display apparatus is used for a various field such as home, a business area, etc.

For example, a large display apparatus such as a digital signage that is installed at a public place or a commercial area to provide digitalized media becomes widely used these days.

The display apparatus may have an issue of an image deterioration where a color change happens at a part of areas of a screen due to a viewing angle. That is, because the display apparatus such a liquid crystal display allows a unique viewing angle, there may be a concern of not providing a user with an image of a uniform quality for every area.

Also, the large display apparatus such the digital signage may be installed in a wall mount manner where the apparatus may be inclined at an angle in order to enhance a visibility.

However, because of a security issue according to the size or install environment of the large display apparatus, the angle of inclination of the apparatus is restricted. Also, there is a problem that is difficult to solve once the display apparatus is installed even though an image deterioration due to the viewing angle of the screen is found.

TECHNICAL PROBLEM

Accordingly, an aspect of the disclosure is to provide a display apparatus, a control method and a recording medium thereof which are capable of compensating an image quality of an area of a screen corresponding to a viewing position, on which distribution is concentrated.

Also, another aspect of the disclosure is to provide a display apparatus, a control method and a recording medium thereof which are capable of providing an image of which a quality is enhanced for areas of the screen according to an installation direction or an inclination angle where, for example, a large display apparatus is installed in a wall mount manner.

TECHNICAL SOLUTION

According to an embodiment of the disclosure, there is provided a display apparatus including: a display; an information obtaining part; and a processor configured to: obtain an information on a plurality of viewing positions of a plurality of users regarding a screen of the display by the information obtaining part, identify a viewing position, on which a distribution is concentrated, among the plurality of viewing positions based on the obtained information, and control to compensate an image quality of an area corresponding to the identified viewing position among a plurality of areas of the screen based on a viewing angle at the identified viewing position.

The plurality of areas of the screen may be divided according to the viewing angle.

The plurality of areas of the screen may be divided according to at least one of a vertical direction or a horizontal direction.

The processor may be configured to: identify the area corresponding to the identified viewing position based on at least one of a distance between the identified viewing position and the display apparatus or the viewing angle at the identified viewing position, and control to compensate the image quality of the identified area.

The display apparatus may further include a storage storing a look-up table including an image quality information, wherein the processor may be configured to: read the image quality information on the area corresponding to the identified viewing position from the look-up table, and control to compensate the image quality of the area based on the read image quality information. The image quality information may correspond to a setting value for at least one of luminance, color gamut, gamma, white balance, sharpness or contrast.

The display apparatus may further include at least one sensor, wherein the processor may be configured to: identify at least one of a screen direction or an inclination of the display based on a sensing result of the sensor, and control to compensate the image quality of the area corresponding to the identified at least one of the screen direction or the inclination of the display.

The display apparatus may further include a storage storing a look-up table including an image quality information, wherein the processor may be configured to: read the image quality information on the area corresponding to the identified at least one of the screen direction or the inclination of the display from the look-up table, and control to compensate the image quality of the area based on the read image quality information.

The information on the plurality of viewing positions of the plurality of users may include an image obtained by at least one of a camera provided in the display apparatus or an external camera. The information on the plurality of viewing positions may include data received from an external apparatus.

According to another embodiment of the disclosure, there is provided a method of controlling a display apparatus, the method including: obtaining an information on a plurality of viewing positions of a plurality of users regarding a screen of a display; identifying a viewing position, on which a distribution is concentrated, among the plurality of viewing positions based on the obtained information, and controlling to compensate an image quality of an area corresponding to the identified viewing position among a plurality of areas of the screen based on a viewing angle at the identified viewing position.

The plurality of areas of the screen may be divided according to the viewing angle.

The plurality of areas of the screen may be divided according to at least one of a vertical direction or a horizontal direction.

The method may further include: identifying the area corresponding to the identified viewing position based on at least one of a distance between the identified viewing position and the display apparatus or the viewing angle at the identified viewing position, wherein the controlling may include controlling to compensate the image quality of the identified area.

The method may further include: reading an image quality information on the area corresponding to the identified viewing position from a look-up table, wherein the controlling may include controlling to compensate the image quality of the area based on the read image quality information. The image quality information may correspond to a setting value for at least one of luminance, color gamut, gamma, white balance, sharpness or contrast.

The method may further include: identifying at least one of a screen direction or an inclination of the display based on a sensing result of a sensor, wherein the controlling may include controlling to compensate the image quality of the area corresponding to the identified at least one of the screen direction or the inclination of the display.

The method may further include: reading an image quality information on the area corresponding to the identified at least one of the screen direction or the inclination of the display from a look-up table, wherein the controlling may include controlling to compensate the image quality of the area based on the read image quality information.

The information on the plurality of viewing positions of the plurality of users may include an image obtained by at least one of a camera provided in the display apparatus or an external camera.

According to further another embodiment of the disclosure, there is provided a computer-readable non-volatile recording medium, on which a computer program of a method that is executable by a display apparatus is recorded, the method including: obtaining an information on a plurality of viewing positions of a plurality of users regarding a screen of a display; identifying a viewing position, on which a distribution is concentrated, among the plurality of viewing positions based on the obtained information, and controlling to compensate an image quality of an area corresponding to the identified viewing position among a plurality of areas of the screen based on a viewing angle at the identified viewing position.

ADVANTAGEOUS EFFECTS

As described above, according to the disclosure, it is possible to provide a display apparatus, a control method and a recording medium thereof which provide a plurality of users with an image in a public area, etc. and are capable of identifying a viewing position, on which a distribution is concentrated, and compensating an image quality of an area corresponding to the identified viewing position, thereby allowing an image of which a quality is enhanced to be provided to the plurality of users.

Also, according to the disclosure, it is possible to provide a display apparatus, a control method and a recording medium thereof which are capable of compensating an image quality deterioration due to a viewing angle for areas according to at least one of an installation direction or an inclination angle where the display apparatus is installed in a wall mount manner.

DESCRIPTION OF DRAWINGS

FIG. 14 illustrates a block diagram representing the configurations of the display apparatuses according to the embodiment.

BEST MODE

Figure 1:
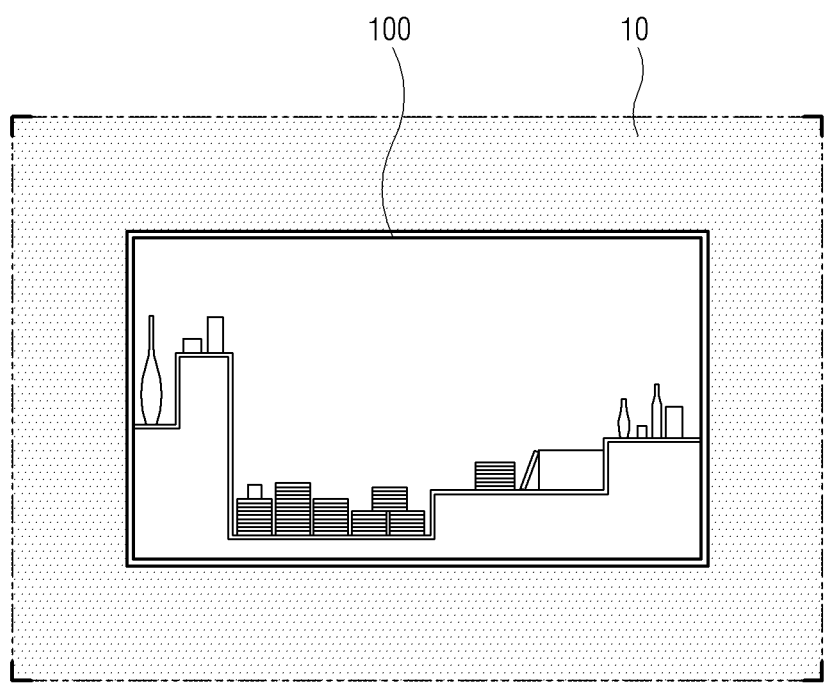
FIG. 1 illustrates a display apparatus according to an embodiment of the disclosure.

Below, embodiments of the disclosure will be described in detail with reference to the accompanying drawings. In the drawings, like numerals or symbols refer to like elements having substantially the same function, and the size of each element may be exaggerated for clarity and convenience of description. However, the technical concept of the disclosure and its key configurations and functions are not limited to those described in the following embodiments. In the following descriptions, details about publicly known technologies or configurations may be omitted if they unnecessarily obscure the gist of the disclosure.

In the following embodiments, terms 'first', 'second', etc. are used only to distinguish one element from another, and singular forms are intended to include plural forms unless otherwise mentioned contextually. In the following embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module for at least one processor. In the disclosure, a term "at least one of" a plurality of elements or the like may not refer to all of the plurality of elements but also to each and every possible combination of the elements.

FIG. 1 illustrates a display apparatus according to an embodiment of the disclosure.

As illustrated in FIG. 1, the display apparatus 100 according to an embodiment of the disclosure is installed on a wall 10 in a wall mount manner.

The display apparatus 100 according to an embodiment of the disclosure may be a large display apparatus, to which a large format display (LFD) is applied, and be embodied as a digital signage or a digital information display (DID) which is installed at a public area, a commercial place or the like to provide digital media to a plurality of users.

Although the large display apparatus applied with the LFD will be described below as an example of the display apparatus 100 in the disclosure, the disclosure is not limited to that. As another example, the display apparatus 100 may be embodied as various apparatuses which can display an image such as a television (TV), a monitor, a digital picture frame, etc.

The display apparatus 100 processes a signal of a content which is provided from an image source (see 200 of FIG. 3) according to an image process to display an image.

The type of the image source which provides the content is not limited and may include a set-top box (STB), a personal computer such as a desktop or a laptop, an optical disc reproducing device such as a Blu-ray disc or a digital versatile disc (DVD), a mobile device such as a smart phone, a tablet or a smart pad, etc.

In case that the display apparatus 100 is a TV, the display apparatus 100 may receive and process a broadcast content based on at least one of a broadcast signal, broadcast information or broadcast data from a transmitter of a broadcasting station. The display apparatus 100 may wirelessly receive a radio frequency (RF) signal, i.e. a broadcast signal from the broadcasting station. To this end, the display apparatus 100 may include an antenna configured to receive a broadcast signal, and a tuner configured to be tuned to a channel corresponding to a broadcast signal.

In the display apparatus 100, the broadcast signal may be received through a terrestrial wave, a cable, a satellite, etc. and the image source 200 as a signal source is not limited to the broadcasting station. In other words, any apparatus or station capable of transceiving data may be included in the image source 200 of the disclosure.

Standards for a signal received by the display apparatus 100 may be various corresponding to the type of the apparatus, and a video content may be received based on, for example, a high definition multimedia interface (HDMI), a composite video, a component video, a super video, a Syndicat des Constructeurs d'Appareils Radiorécepteurs et Téléviseurs (SCART), a universal serial bus (USB), etc. by a wire.

Also, the display apparatus 100 may receive image content from various external apparatuses including a server through a wireless communication. There are no limits to the type of the wireless communication, and the display apparatus 100 may perform at least one of a wireless communication using an access point (AP), or a wireless communication for direct connection with other devices without the AP. For example, the display apparatus 100 may receive a content from an image source through a wireless communication such as Wi-Fi, Wi-Fi direct, Bluetooth, etc.

Further, the display apparatus 100 may perform a signal process to display on a screen a moving image, a still image, an application, an on-screen display (OSD), a user interface (UI, hereinafter also referred to as a graphic user interface (GUI)) for various operation controls, etc. based on a signal/data stored in an internal/external storage medium.

According to an embodiment, the display apparatus 100 may operate as a smart TV or an Internet protocol (IP) TV. The smart TV refers to a TV that is capable of receiving and displaying a broadcast signal in real time, has a web browsing function so that various contents can be searched and consumed through the Internet while the broadcast signal is displayed in real time, and provides a convenient user environment for the web browsing function. Further, the smart TV includes an open-source software platform and thus provides an interactive service to a user. Accordingly, the smart TV may provide a user with various contents, for example, an application for providing a predetermined service through the open-source software platform. Such an application refers to an application program for providing various kinds of services, and may include applications for providing services such as a social network service, finance, news, weather, a map, music, a movie, a game, an electronic book, etc.

Figure 2:
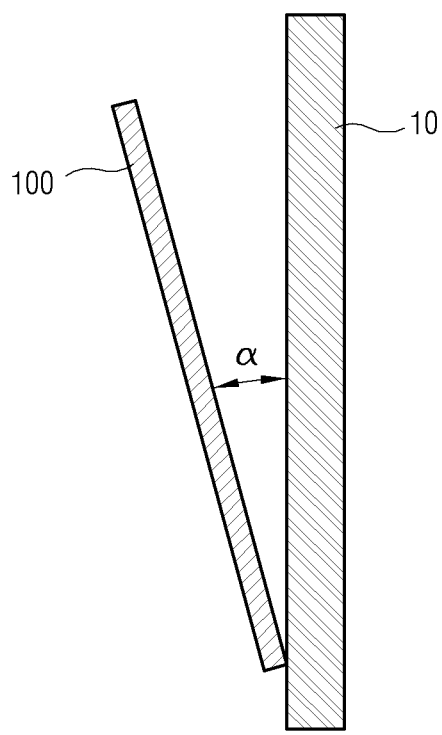
FIG. 2 illustrates a display apparatus of the disclosure which is installed.

FIG. 2 illustrates a display apparatus of the disclosure which is installed.

The display apparatus 100 is, as illustrated in FIG. 2, installed on a wall 10 with an inclination of an angle a.

However, the installation form of the display apparatus 100 is not limited to FIG. 2. That is, the display apparatus 100 may be installed on the wall 10 without an inclination, or be slantingly installed in an upper, lower, leftward or rightward direction.

Below, specific configurations of the display apparatus of the disclosure will be described referring to drawings.

Figure 3:
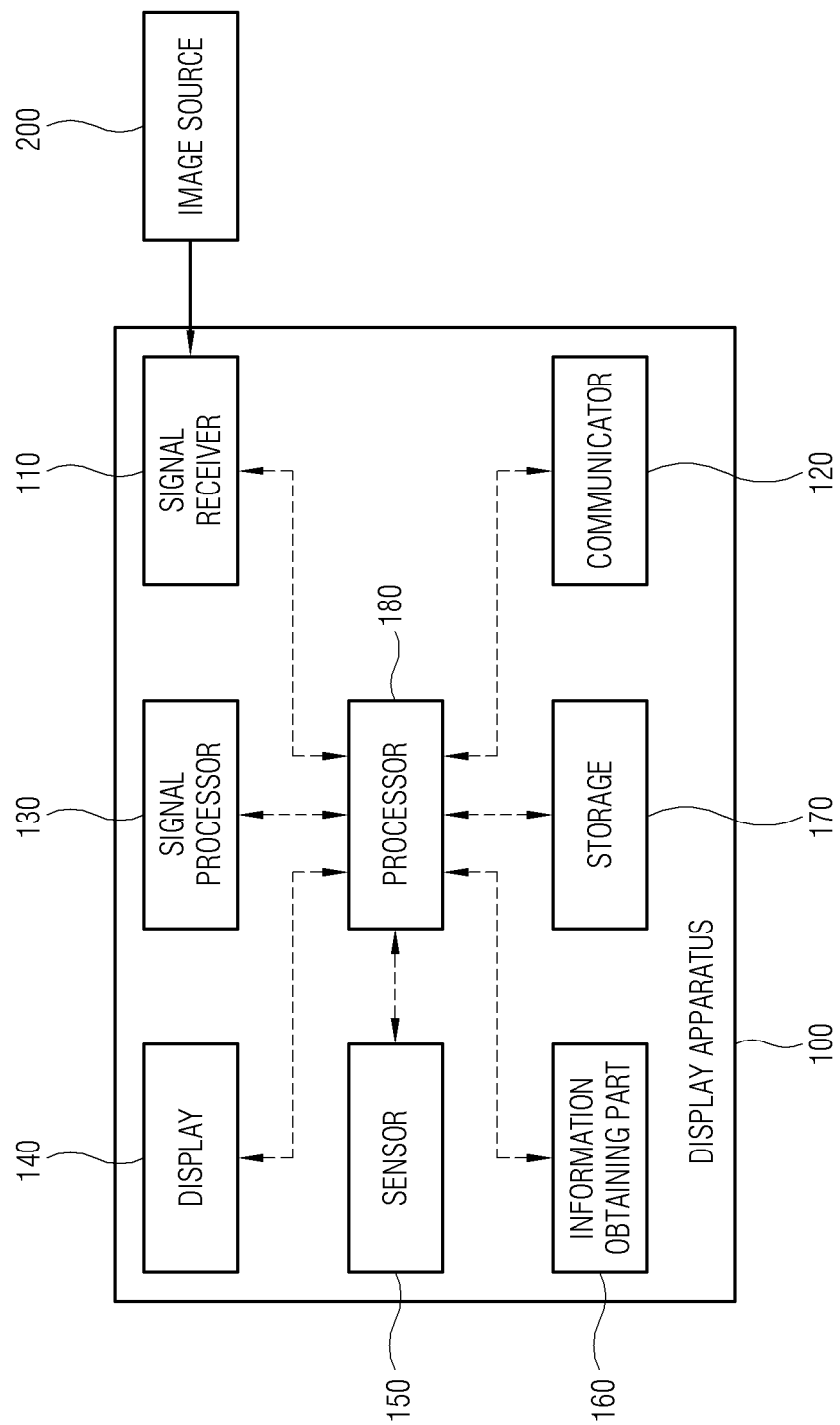
FIG. 3 illustrates a block diagram of the display apparatus of the disclosure.

FIG. 3 illustrates a block diagram of the display apparatus of the disclosure.

As illustrated in FIG. 3, the display apparatus 100 of the disclosure includes a signal receiver 110, a communicator 120, a signal processor 130, a display 140, a sensor 150, an information obtaining part 160, a storage 170 and a processor 180.

The signal receiver 110 receives a content from an image source 200. For example, the signal receiver 110 may include a tuner to tune to a broadcast signal for each channel.

The signal receiver 110 may include a connector to connect with the image source 200 in a wired manner. The display apparatus 100 may receive a content from the image source through the connector.

The connector is embodied as a communication circuitry which includes a data input-output interface with a combination of communication modules (e.g. a S/W module, a chip, etc.), ports, etc. corresponding to various communication protocols.

The connector may send or receive a signal/data according to standards such as High Definition Multimedia Interface (HDMI), an HDMI consumer electronics control (HD-MICEC), USB, Component, etc., and include at least one terminal corresponding to each standard.

The connector basically receives a signal from the image source 200 and may be provided as receiving and sending signals in both directions.

An apparatus that is connected to the display apparatus 100 through the connector in a wired manner is the image source 200 such as a set-top box, a PC, etc., but is not limited. For another example, the display apparatus 100 may be connected to a mobile device through the connector in a wired manner.

The display apparatus 100 and the image source 200 may be connected through a communicator 120 which performs a wired or wireless communication.

The communicator 120 performs a wireless communication with at least one external apparatus including the image source 200. The display apparatus 100 receives a content from the image source 200 wirelessly through the communicator 120.

The communicator 120 may be embodied as a communication circuitry which includes wireless communication modules (e.g. a S/W module, a chip, etc.), ports, etc. corresponding to various communication protocols.

For example, the communicator 120 includes a wireless local area network (LAN) unit. The wireless LAN unit is connected to an external apparatus wirelessly through an access point (AP) according to a control of the processor 180. The wireless LAN unit includes a Wi-Fi communication module.

As an example, the communicator 120 includes a short distance communication module which supports a direct communication between the display apparatus 100 and the external apparatus without the AP. The short distance communication module includes at least one of Wi-Fi Direct, Bluetooth, Bluetooth Low Energy, a radio frequency (RF) communication, an infrared data association (IrDA) communication, Zigbee, Ultra Wideband (UWB), Near Field Communication (NFC), etc. In case that the display apparatus 100 performs the direct communication with the external apparatus, the storage 170 stores address information on the external apparatus as a device to communicate with, for example, a MAC address or an IP address.

In the display apparatus 100 of the disclosure, the communicator 120 is provided to perform a wireless communication with the external apparatus using at least one of the wireless LAN unit or the short distance communication module according to performance.

In another example, the communicator 120 includes a wired communication module such as Ethernet. In further another example, the communicator 120 may further include a communication module in various communication methods, that is, a mobile communication such as Long Term Evolution, an electromagnetic communication, a visible light communication, a sound communication, etc.

In an embodiment, the display apparatus 100 receives a video content from the image source 200 such as an external server through the communicator 120 in a real-time streaming method. For example, the display apparatus 100 may receive a content in the streaming method using a service such as Netflix, Youtube, etc.

The signal processor 130 performs various image/audio processes on a signal of a content. The signal processor 130 outputs to the display 140 an image signal which is generated by performing such image processes to display an image corresponding to the image signal. The image signal processed by the signal processor 130 is based on data stored in a non-volatile storage 170 such as a flash memory, a hard disc drive, etc.

The image processor 130 includes a decoder configured to decode an image signal to correspond to an image format of the display apparatus 100, and a scaler configured to adjust the image signal to an output standard of the display 140.

According to an embodiment, the decoder may be actualized by, for example, a moving picture experts group (MPEG) decoder, but the type of the content processed by the signal processor 130 is not limited thereto. In other words, the content processed by the image processor 130 includes a moving image such as a video as well as a still image such as a photo, a background image of a JPEG file, etc.

According to an embodiment, the signal processor 130 performs image processes for image quality enhancement such as a scaling factor, sharpness, peaking, color enhancement, noise reduction, etc.

There are no limits to the kind of the image processes performed by the image processor 130 of the disclosure. For example, the image processor 130 may perform at least one of various processes such as de-interlacing for converting an interlaced-type broadcast signal into a progressive-type broadcast signal, detail enhancement, frame refresh rate conversion, and line scanning.

The image processor 130 may be actualized as a group of individual elements for independently performing such processes, or may be actualized as included in a main system-on-chip (SoC) where many functions are integrated. The main SoC may include at least one of a microprocessor or a central processing unit (CPU) as an example of the processor 180 (to be described later).

According to an embodiment, the image processor 130 may be actualized by a video board where circuitry components such as various chipsets, memories, electronic parts, wiring lines, and the like for performing such processes are mounted onto a printed circuit board (PCB). In this case, the image processor 130 and the processor 180 may be provided at a single video board in the display apparatus 100. Of course, this is merely an example, and alternatively such elements may be arranged in a plurality of printed circuit boards connectable for communication with each other.

The image signal processed by the image processor 130 is output to the display 140. The display 140 displays on a screen an image based on the image signal received from the image processor 130.

The display 140 may be actualized by various display types, for example, liquid crystal, plasma, a light emitting diode, an organic light emitting diode, a surface-conduction electron-emitter, a carbon nano-tube, nano-crystal, etc. without limitations.

According to an embodiment, the display 140 includes a display panel for displaying an image thereon, and may further include an additional element (e.g. a driver) according to the types.

The display apparatus 100 is installed in one of a landscape mode or a portrait mode corresponding to a rotation direction.

A screen of the display 140 is divided into a plurality of areas. Here, the plurality of areas may be divided corresponding to a viewing angle of a user who watches the screen.

FIGS. 4 to 8 illustrate examples of a screen of the display apparatus divided into a plurality of areas.

Figure 4:
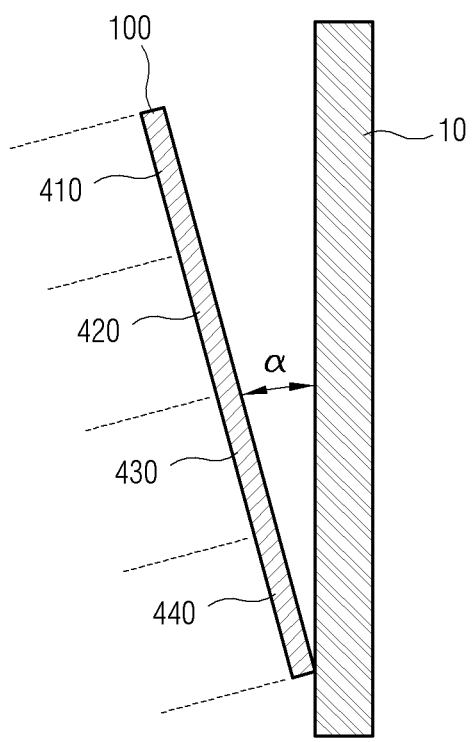
FIGS. 4 through 8 illustrate examples where the screen of the display apparatus is divided into a plurality of areas according to an embodiment of the disclosure.

As described in FIG. 4, the screen of the display 140 in the display apparatus 100, which is installed in a wall-mount manner, is divided into a plurality of areas 410, 420, 430 and 440 from an upper part to a lower part, that is, in a vertical direction. Here, FIG. 4 illustrates the display apparatus 100 installed on a wall 10 with an inclination of an angle a, but the installation type of the disclosure is not limited thereto.

FIG. 4 illustrates an example where the screen of the display 140 is divided into four areas, but the number and size of the screen of the disclosure is not limited thereto.

The number and size (height) of the plurality of areas 410, 420, 430 and 440 of an embodiment are determined corresponding to a predetermined reference viewing position in front of the display 140. In other words, the number and size of the plurality of areas 410, 420, 430 and 440 may be determined based on a viewing angle of a user who watches the screen of the display 140 at the reference viewing position.

In another embodiment, the number and size of the plurality of areas 410, 420, 430 and 440 may be determined in consideration of a viewing angle of the display 140.

Also, the number and size of the plurality of areas 410, 420, 430 and 440 varies according to a screen direction of the display 140.

Figure 5:
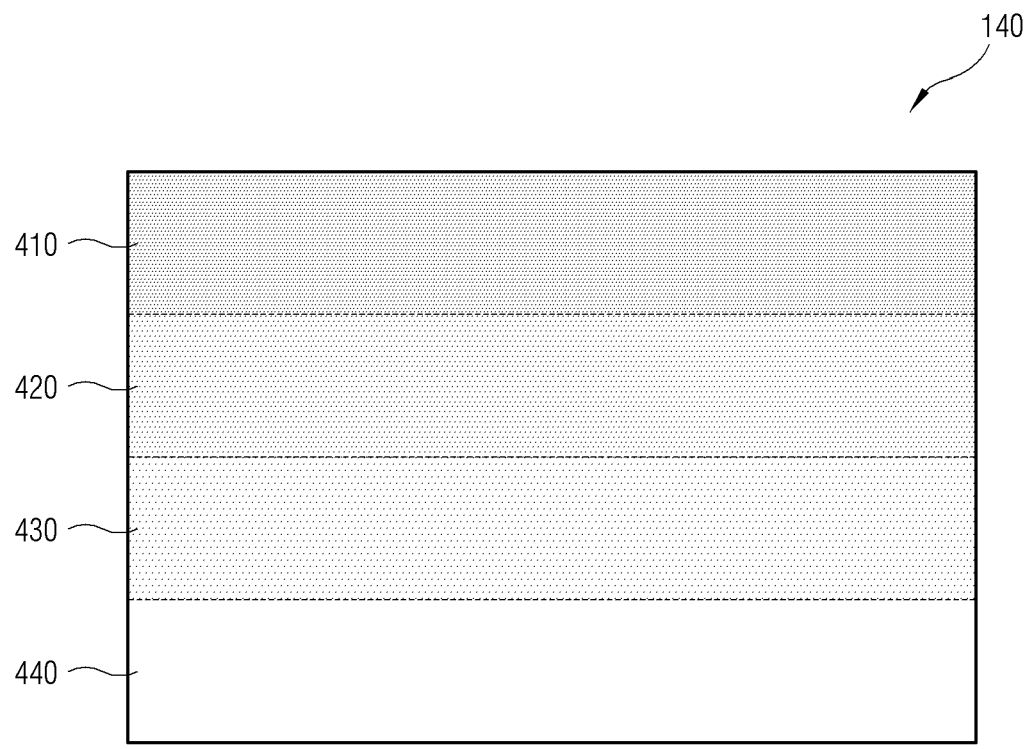

Specifically, in case of the screen direction of the display 140 being a horizontal mode, as illustrated in FIGS. 4 and 5, the screen of the display 140 is divided into four areas, that is, a first area 410 through a fourth area 440 in an upper-to-lower direction (the vertical direction).

Figure 6:
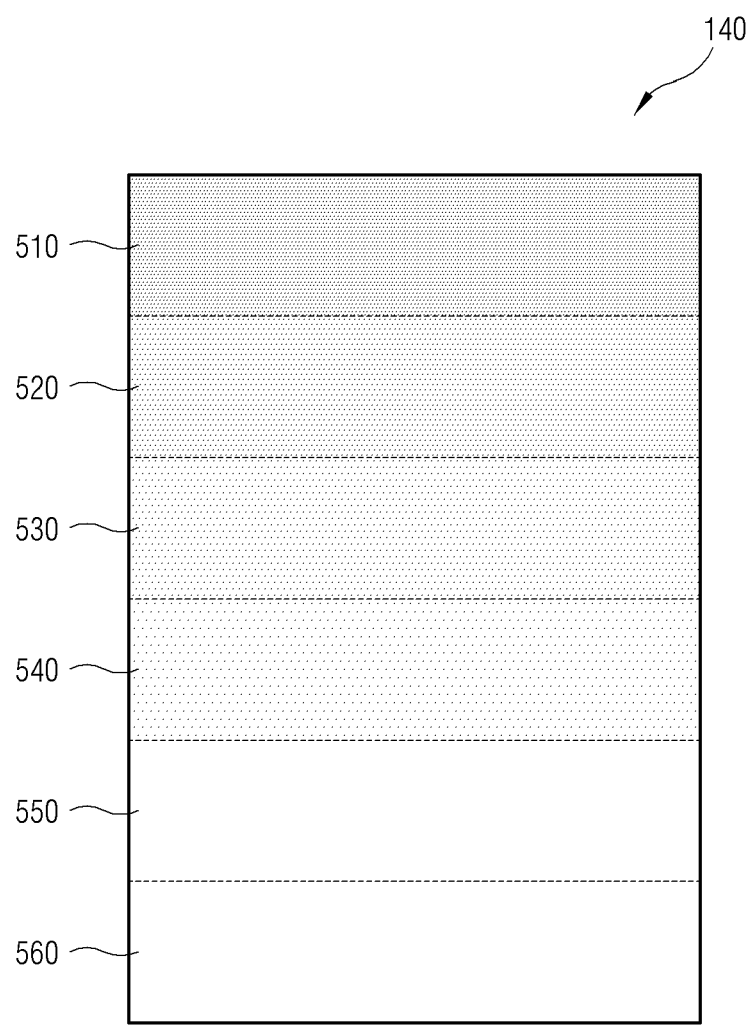

Meanwhile, in case of the screen direction of the display 140 being a vertical mode, as illustrated in FIG. 6, the screen of the display 140 is divided into six areas, that is, a first area 510 through a sixth area 560 in the upper-to-lower direction (vertical direction).

In the meantime, according to an embodiment, the display 140 of the display apparatus 100 may also have a viewing angle in a horizontal direction (left-to-right direction), and the screen of the display 140 may be divided into the plurality of areas in the horizontal direction as well as into the vertical direction (upper-to-lower direction).

Figure 7:
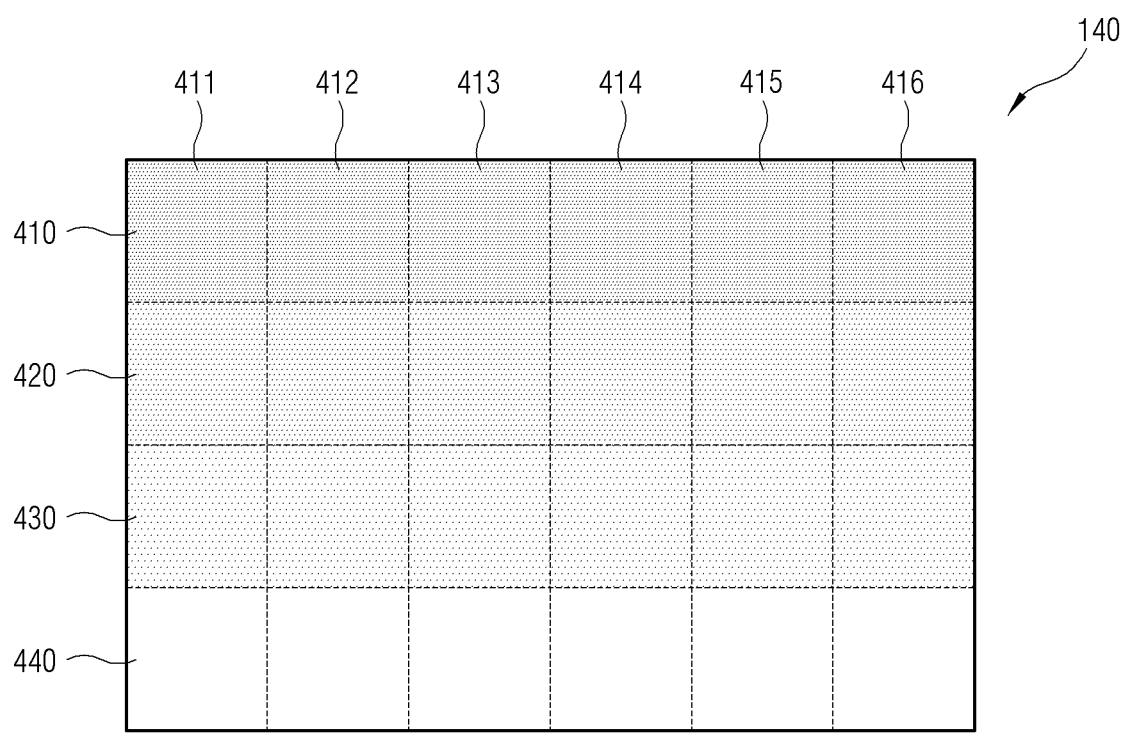

Specifically, in case of the screen direction of the display 140 being the horizontal mode, as illustrated in FIG. 7, the screen of the display 140 is divided into 6×4 areas, that is, 24 areas in the vertical and horizontal directions. In other words, the first area 410 illustrated in FIG. 5 is divided into six sub areas 411, 412, 413, 414, 415 and 416 in the horizontal direction.

Figure 8:
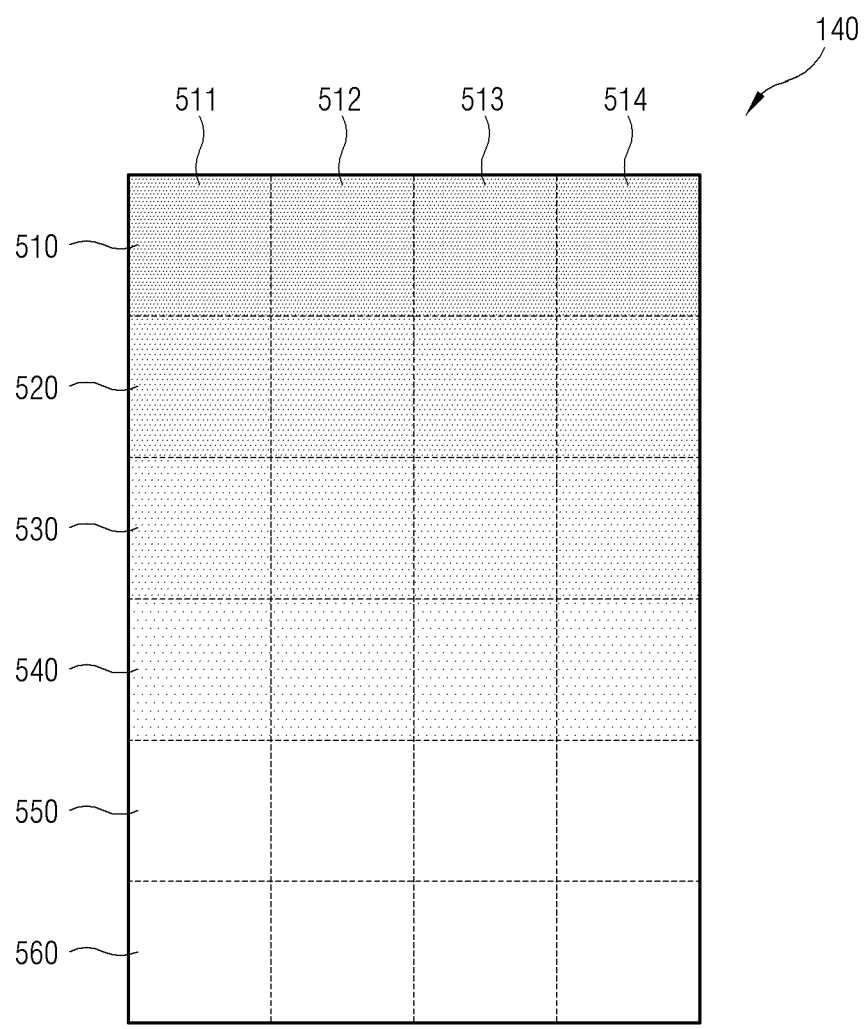

Meanwhile, in case of the screen direction of the display 140 being the vertical mode, as illustrated in FIG. 8, the screen of the display 140 is divided into 4×6 areas, that is, 24 areas in the horizontal and vertical directions. In other words, the first area 510 illustrated in FIG. 6 is divided into four sub areas 511, 512, 513 and 514 in the horizontal direction.

Although FIGS. 7 and 8 illustrate examples where the screen of the display 140 is divided into 24 areas, the number and size (width/height) of the screen of the disclosure is not limited thereto. Also, the disclosure includes a case where the screen of the display 140 is divided into a plurality of areas along the horizontal direction.

The sensor 150 includes at least one sensor provided in the display apparatus 100. The type/number of the sensor 150 is not limited but includes, for example, a gravity sensor, an acceleration sensor, or a gyro sensor, etc.

For example, the gravity sensor measures a gravitational acceleration in x,y,z axes detects which of the horizontal or vertical direction is the screen direction, and outputs a signal of the detection result to the processor 180.

Also, the gyro sensor measures a rotation velocity in x,y,z axes detects an inclination of the display apparatus 100 installed in a wall-mount manner, and outputs a signal of the detection result to the processor 180.

The information obtaining part 160 obtains information on the viewing positions of a plurality of users for the screen of the display 140. The display apparatus 100 identifies a viewing position on which a distribution is concentrated among the viewing positions of the plurality of users based on the information obtained by the information obtaining part 160.

In an embodiment, the information obtaining part 160 includes a camera (see 161 of FIG. 11) which is provided in the display apparatus 100.

The processor 180 identifies from an image photographed by the camera 161 the viewing position on which the distribution is concentrated, where a large number of users are found at the viewing position.

The method of identifying from the photographed image the position where a large number of users are found is not limited. For example, the processor 180 senses a shape of a user from the photographed image or uses various algorithms such as tracing an eye of a user, etc.

In another embodiment, the display apparatus 100 is provided with an image through the communicator 120 from an external camera of, for example, a peripheral closed circuit television (CCTV) where the display apparatus 100 is installed. In this case, the processor 180 obtains the information on the viewing positions of the plurality of users for the screen of the display 140 based on the image provided from the CCTV camera, where the communicator 120 is included in the information obtaining part 160.

In still another embodiment, the display apparatus 100 may obtain information on users around the display apparatus 100 from a server that stores big data through the communicator 120. Here, the information provided by the server includes an image photographed by a peripheral CCTV camera, position information obtained by terminals, for example, smartphones of the users around the display apparatus 100, etc. The server obtains, based on such information, information indicating that users are gathered at a position around the display apparatus 100 at a time, for example, after six o'clock P.M.

The processor 180 obtains, based on the information provided by the server, the information on the viewing positions of the plurality of users for the screen, and the communicator 120 may by included in the information obtaining part 160.

The storage 170 is configured to store various data of the display apparatus 100. The storage 170 may be actualized by a nonvolatile memory (or a writable ROM) which can retain data and apply changes even though the display apparatus 100 is powered off. The storage 170 may be provided as at least one among a flash memory, an HDD, electrically programmable ROM (EPROM) or electrically erasable and programmable ROM (EEPROM). The storage 170 may further include a volatile memory such as a dynamic RAM (DRAM) or static RAM (SRAM), of which reading or writing speed for the display apparatus 100 is faster than that of the nonvolatile memory.

Data stored in the storage 170 may not only include, for example, an operating system (OS) for driving the display apparatus 100 but also include various software, programs, applications, image data, appended data, etc. executable on the OS.

The storage 170 may store a look-up table (LUT) which includes image quality information to compensate a quality of an image that is displayed on the display 140 for at least one of a screen direction or an inclination of the display apparatus 100. Here, the image quality information includes various setting values corresponding to display characteristics of the image.

The setting values, that is, quality adjustment values include at least one of luminance, color gamut, gamma, white balance, sharpness, contrast, color saturation, tint, brightness, chroma, offset and gain.

The image quality information stored in the table of an embodiment is configured to have setting values which are different from one another for the plurality of areas of the screen of the display 140. For example, the quality of an image signal may be adjusted by different setting values for the first area 410 at an edge and the second area 420 at a middle of the screen of the display 140 illustrated in FIG. 5. In another example, the quality of an image signal may be adjusted by different setting values for the first sub area 411 and the second sub area 412 illustrated in FIG. 7.

In an embodiment, the image quality information includes a gradation value of an image signal. The processor 180 may change the gradation value of a pixel for the areas of the screen of the display 140 based on the image quality information of the table.

In an embodiment where the display 140 performs a local dimming according to an embodied form thereof, the setting value for the image quality adjustment is determined in consideration of the local dimming.

The processor 180 performs control to operate general elements of the display apparatus 100. The processor 180 executes a control program (or an instruction) for performing such control operations. The processor 180 includes at least one universal processor that loads at least a part of a control program from a nonvolatile memory, in which the control program is installed, to a volatile memory, and executes the loaded control program, and may be actualized by, for example, a central processing unit (CPU), an application processor (AP), or a microprocessor.

The processor may include a single core, a dual core, a triple core, a quad core, and the like multiple core. The processor may include a plurality of processors, for example, a main processor and a sub processor that operates in a sleep mode (during which only standby power is supplied without operation as the display apparatus). Further, the processor, the ROM, and the RAM may be connected to one another through an internal bus, and the ROM and the RAM belong to the storage 170.

In the disclosure, the processor, as an example of the processor 180, may be actualized as included in a main SoC mounted to the PCB internally provided in the display apparatus 100. Alternatively, the main SoC may further include the signal processor 130.

The control program may include a program(s) achieved as at least one of a basic input/output system (BIOS), a device driver, an operating system (OS), a firmware, a platform, or an application. According to an exemplary embodiment, the application may be previously installed or stored in the display apparatus 100 when the display apparatus 100 is manufactured, or may be installed in the display apparatus 100 on the basis of application data received from outside when it is required in the future. The application data may be downloaded, for example, from an external server such as an application market to the display apparatus 100. The external server is merely an example of the computer program product according to the disclosure, but is not limited thereto.

According to an embodiment, the operation of the processor 180 may be actualized as a computer program stored in the computer program product (not shown) provided separately from the display apparatus 100. In this case, the computer program product includes a memory in which an instruction corresponding to a computer program is stored, and a processor. The instruction, when it is executed by the processor, includes obtaining the information on the viewing positions of the users for the screen of the display 140 by the information obtaining part 160, identifying the viewing position, on which the distribution is concentrated, among the viewing positions based on the obtained information, and controlling to compensate the image quality of the area corresponding to the identified viewing position among the areas of the screen based on the viewing angle at the identified viewing position.

Accordingly, the display apparatus 100 performs the operations of the processor 180 by downloading and executing the computer program stored in the separate computer program product.

As below, referring to the drawings, embodiments of the display apparatus 100 of the disclosure to compensate the image quality for the areas of the screen will be described.

Figure 9:
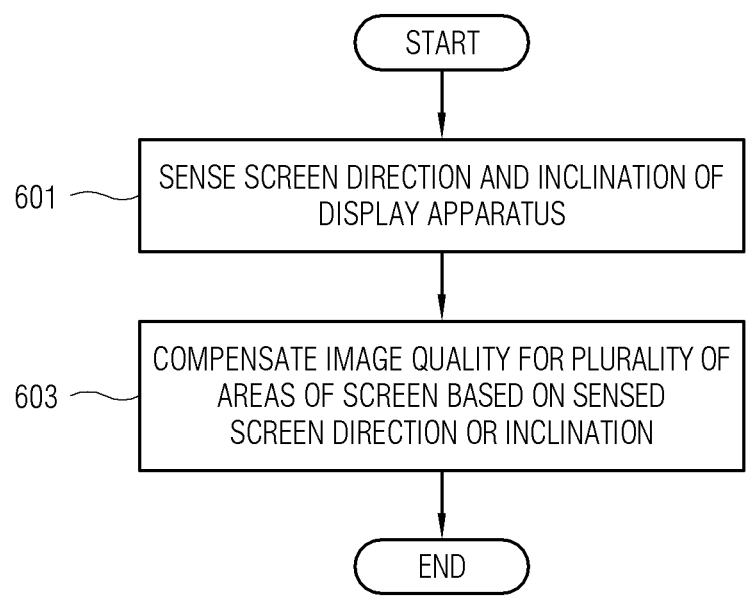
FIG. 9 illustrates a flowchart representing a control method of the display apparatus according to a first embodiment of the disclosure.

FIG. 9 illustrates a flowchart representing a control method of the display apparatus according to a first embodiment of the disclosure.

As illustrated in FIG. 9, the display apparatus 100 senses at least one of the screen direction or the inclination of the display apparatus 100 by at least one sensor provided as the sensor 150 (601). For example, a gyro sensor outputs a signal sensing the inclination of the display apparatus 100 to the wall 10, whereas an acceleration sensor outputs a signal sensing which of the horizontal direction or the vertical direction is a direction of the screen of the display 140. In response to the signal indicating the sensing result received from the sensor, the processor 180 determines at least one of the screen direction of the inclination of the display apparatus 100.

Based on the at least one of the screen direction or the inclination sensed in the operation 601, the processor 180 compensates the image quality for the plurality of areas of the screen of the display 140 (603). Specifically, the processor 180 reads from the look-up table of the storage 170 the image quality information, that is, a setting value for the image quality adjustment corresponding to the at least one of the screen direction of the inclination sensed in the operation 601. Based on the read information, the processor 180 controls the signal processor 130 to adjust the image quality for an area among the areas of the screen of the display 140.

In an embodiment, the processor 180 adjusts the image signal so that an image displayed on, for example, the first area 410 or the fourth area 440 at the edge among the areas of the screen of the display 140 as illustrated in FIG. 5 compensates the image quality deterioration due to the viewing angle.

In another embodiment, the processor 180 adjusts the image signal so that images displayed on, for example, the first area 510 and the second area 520 of the screen of the display 140 as illustrated in FIG. 6 compensate the image quality deterioration due to the viewing angle. Here, the image qualities for the first area 510 and the second area 520 may be compensated by the setting values which are different from one another.

In still another embodiment, the processor 180 adjusts the image signal so that images displayed on, for example, the first sub area 411 through the sixth area 416, respectively, of the screen of the display 140 as illustrated in FIG. 9 compensate the image quality deterioration due to the viewing angle.

The examples described above are cases where the display apparatus 100 compensates the images displayed on a part of the areas of the screen of the display 140, but are not limited thereto.

That is, the display apparatus 100 of the disclosure may perform an image quality compensation based on the image quality information read from the look-up table for each of the areas of the screen of the display 140. In this case, the setting value may be gradually applied according to the viewing angle for each of the areas of the screen.

Meanwhile, the display apparatus 100, which is capable of compensating the image quality compensation for each of the areas of the screen, may be a large display apparatus such as a digital signage or a digital information display which is installed at a public place, etc. to provide digital media or information to a plurality of users.

Below, an example where the display apparatus 100, which is provided to be watched by a plurality of users, compensates the image quality according to the viewing position on which the distribution of the users is concentrated will be described.

Figure 10:
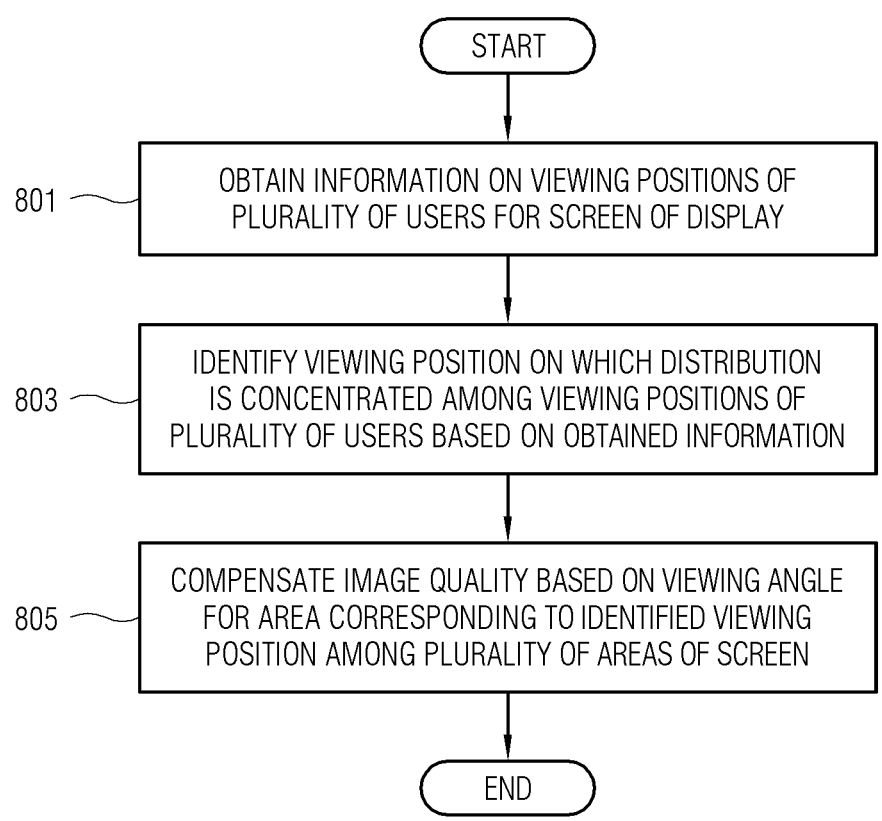
FIG. 10 illustrates a flowchart representing a control method of the display apparatus according to a second embodiment of the disclosure.
Figure 11:
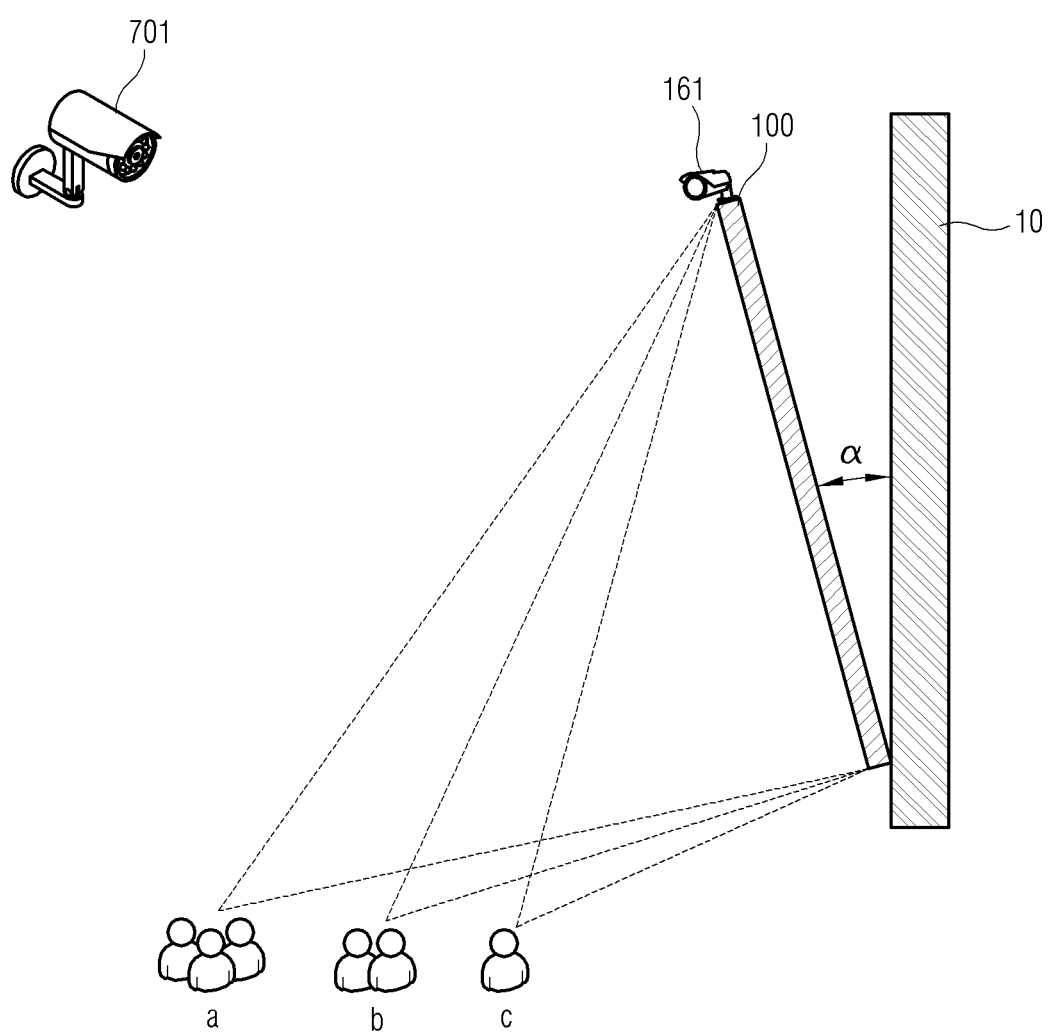
FIGS. 11 and 12 illustrate operations according to the viewing position of a user and the distribution in the second embodiment of the disclosure.
Figure 12:
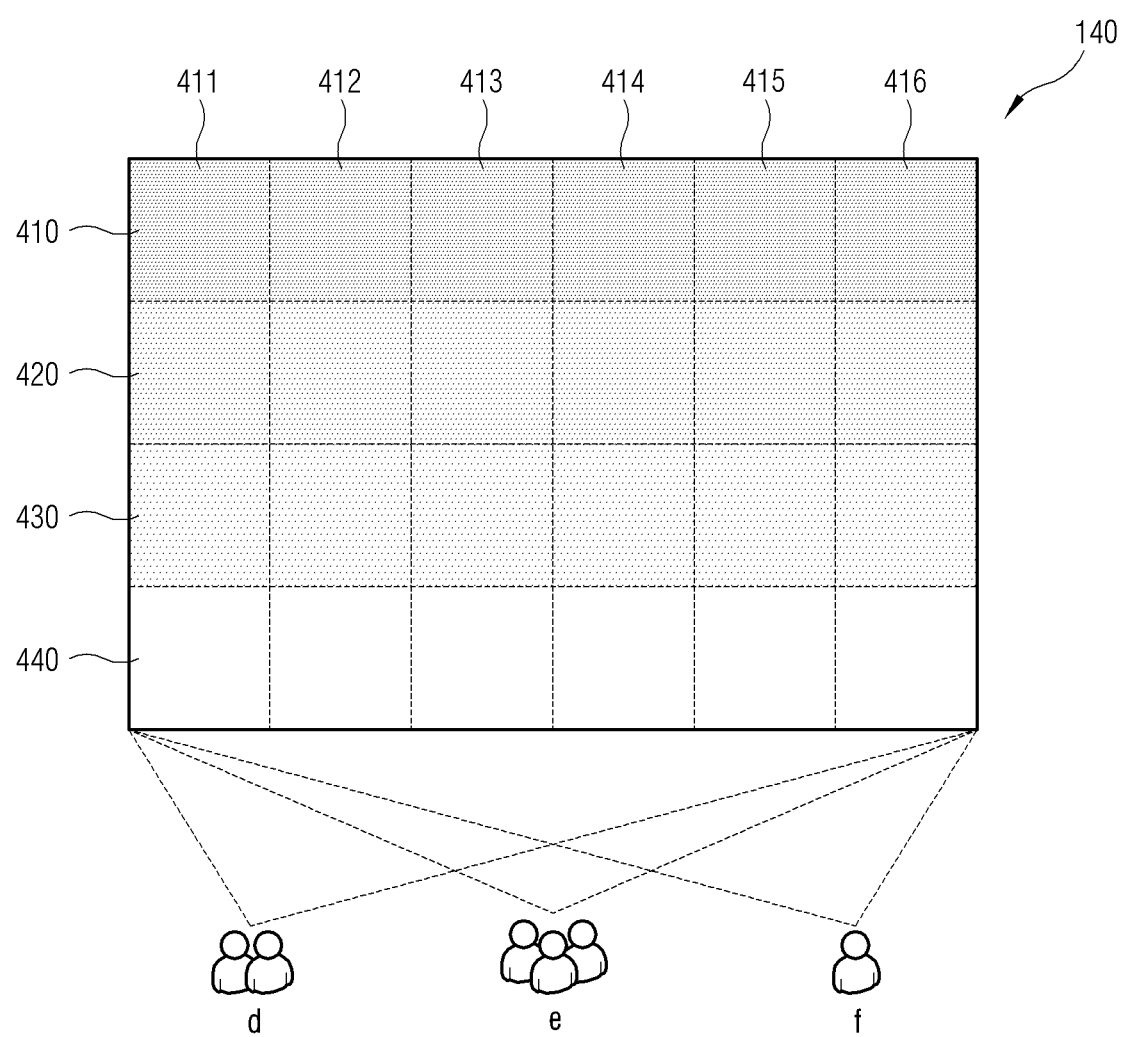

FIG. 10 illustrates a flowchart representing a control method of the display apparatus according to a second embodiment of the disclosure. FIGS. 11 and 12 illustrate operations according to the viewing position of a user and the distribution.

As illustrated in FIG. 10, the display apparatus 100 obtains the information on the viewing positions of a plurality of users for the screen of the display 140 through the information obtaining part 160 (801).

In an embodiment, a camera 161 which photographs an image is install in the display apparatus 100 as illustrated in FIG. 11 where the processor 180 obtains the image photographed by the camera 161 as the information on the viewing positions of the plurality of users.

In another embodiment, the display apparatus 100 may obtain the information on the viewing positions of the plurality of users in a manner of receiving through the communicator 120 an image photographed by an external camera, for example, a CCTV camera (701 in FIG. 11) around the display apparatus 100.

In still another embodiment, the display apparatus 100 may obtain the information on the viewing positions of the plurality of users in a manner of receiving through the communicator 120 information on the users around the display apparatus 100 from an external apparatus including a server storing big data. Here, the information on the viewing positions of the plurality of users includes an image photographed by a peripheral CCTV camera, position information obtained by terminals, for example, smartphones of the users around the display apparatus 100, etc.

Based on the information obtained in the operation 801, the processor 180 identifies the viewing position on which the distribution is concentrated among the viewing positions of the plurality of users (803).

Here, the obtained information being the images photographed by the cameras 161 and 170, the processor 180 may determine a position where a number of users are found as the viewing position, on which the distribution is concentrated, by sensing a shape of the user from the photographed image or using various algorithms such as tracing an eye of the user, etc.

Specifically, the processor 180 identifies the viewing position, on which the distribution is concentrated, where the distribution has a criterion of a distance from the display apparatus 100 (distance distribution) or the viewing angle of the user who watches the display 140 (vertical distribution). For example, as illustrated in FIG. 11, a viewing position a where a number of users are found among the viewing positions a, b and c in front of the display apparatus 100 is determined as the viewing position on which the distribution is concentrated.

Also, the processor 180 may identify the viewing position, on which the distribution is concentrated, where the distribution has a criterion of a center of the display apparatus 100 (left-right distribution or horizontal distribution). For example, as illustrated in FIG. 12, a viewing position e where a number of users are found among the viewing positions d, e and f in front of the display apparatus 100 is determined as the viewing position on which the distribution is concentrated.

The processor 180 of the display apparatus 100 in the embodiment may identify the viewing position, on which the distribution is concentrated, among the viewing positions of the users according to at least one of the distance distribution, the vertical distribution or the horizontal distribution.

The processor 180 controls the signal processor 130 to compensate the image quality based on the viewing angle for the area corresponding to the viewing position identified in the operation 803 among the plurality of areas of the screen of the display 140 (805).

The processor 180 determines the area for the compensation among the plurality of areas of the screen of the display 140 based on at least one of the distance between the viewing position, on which the distribution is concentrated, and the display apparatus 100 or the viewing angle of the user who watches the display 140 at the viewing position.

For example, as illustrated in FIG. 11, if the viewing position a is determined as the position on which the distribution is concentrated among the viewing positions a, b and c, where the distance from the display apparatus 100 is relatively far and the viewing angle of the user is small, the processor 180 compensates an image displayed on an area among the plurality of areas, where the distance from the viewing position a is relatively close or the viewing angle of the user is small, for example, the fourth area 440 at a lower part of the screen illustrated FIGS. 4 and 5. The processor 180 reads image quality information corresponding to the fourth area 440 from the look-up table, and compensates the image quality by adjusting an image signal of the fourth area 440 based on the read image quality information, that is, a setting value. Here, the processor 180 reads the image quality information for the fourth area 440 which is stored according to the screen direction of the display 140, that is, the horizontal direction.

In another embodiment, if the viewing position c is determined as the position on which the distribution is concentrated among the viewing positions a, b and c illustrated in FIG. 11, where the distance from the display apparatus 100 is relatively close and the viewing angle of the user is large, the processor 180 compensates an image displayed on an area among the plurality of areas, where the distance from the viewing position c is relatively far or the viewing angle of the user is large, for example, the first area 410 at an upper part of the screen illustrated FIGS. 4 and 5.

In still another embodiment, as illustrated in FIG. 12, if the viewing position e is determined as the position on which the distribution is concentrated among the viewing positions d, e and f, the processor 180 compensates an image displayed on an area among the plurality of areas, where the distance from the viewing position e is relatively far or the viewing angle of the user is large, for example, the left or right lateral area 411 or 416.

If the viewing position d is determined as the position on which the distribution is concentrated among the viewing positions d, e and f illustrated in FIG. 12, the processor 180 compensates an image displayed on an area among the plurality of areas, where the distance from the viewing position d is relatively far, for example, the right side area 415 or 416.

The processor 180 of the display apparatus 100 in the embodiment does not only determine the area for the compensation in consideration of the vertical distribution regarding the viewing angle of the user for the display 140 as described above but also determines in consideration of the left-right distribution (horizontal distribution).

When the area for the compensation is determined, the processor 180 reads the image quality information that is, the setting value, corresponding to the determined area from the look-up table of the storage 170, and compensates the image quality by controlling the signal processor 130 to adjust an image signal of the area according to the read setting value.

Here, the processor 180 compensates the image quality so that the image on the compensated area is displayed at a same or similar quality as other areas on which the compensation is not necessary.

In the display apparatus 100 of the embodiment, the operations 801 through 805 compensating the image quality by identifying the position on which the user distribution is concentrated with the information obtained above may be performed according to a period.

Accordingly, because the image quality deterioration of an area due to the viewing angle at the position where a number of users gather in a public place is compensated, it is possible to provide the users with an image of which the quality is enhanced for every area of the screen.

Meanwhile, the display apparatus 100 of an embodiment may determine a defined reference position as the position on which the user distribution is concentrated, and compensate the image quality of the area corresponding to the determined reference position.

For example, the processor 180 may guide the users to naturally gather at the viewing position c by controlling to compensate the image quality of the area, e.g. the first area 410 illustrated in FIG. 5, corresponding to the viewing position c among the viewing position a, b and c illustrated in FIG. 11.

Meanwhile, in another embodiment, the large format display (LFD) such as the digital signage, a digital information display, etc. is embodied by a plurality of display apparatuses.

Figure 13:
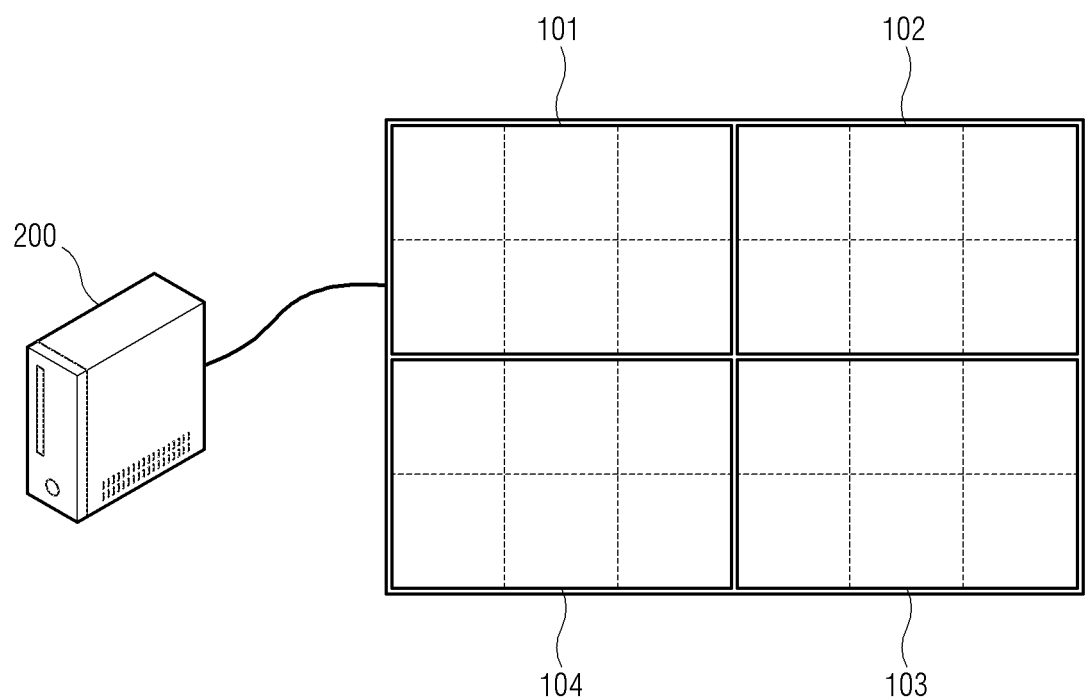
FIG. 13 illustrates display apparatuses according to another embodiment.

FIG. 13 illustrates display apparatuses according to another embodiment. FIG. 14 illustrates a block diagram representing the configurations of the display apparatuses according to the embodiment.

In the embodiment as illustrated in FIG. 13, the plurality of display apparatuses 101, 102, 103 and 104 form a video wall. The video wall displays multiple images divided from a video wall image on the display apparatuses 101, 102, 103 and 104, respectively, where the images are scaled for a number and arrangement of the display apparatuses 101, 102, 103 and 104. As the frame of the video wall image are divided for each of the display apparatuses 101, 102, 103 and 104, the display apparatuses 101, 102, 103 and 104 display the divided individual images separately so that a single image can be displayed on an overall display of the video wall.

Referring to FIG. 13, as an example, the display apparatuses 101, 102, 103 and 104 forming the video wall system are arranged in a 2×2 matrix. However, the example is merely an embodiment for convenience of description and the number and arrangement of the display apparatuses 101, 102, 103 and 104 are not limited thereto.

As illustrated in FIG. 13, the screens of the displays of the display apparatuses 101, 102, 103 and 104 forming the video wall, that is, an overall display are divided into a plurality of areas in response to the viewing angle of the user who watches the screen like the embodiment as the single display apparatus 100.

Each of the display apparatuses 101, 102, 103 and 104 is connected to a neighboring display apparatus one another in a daisy chain. Each of the display apparatuses 101, 102, 103 and 104 connected one another in the daisy chain receives an image signal, a control signal, etc. from the image source 200 or another display apparatus, and bypasses the received image signal to the neighboring display apparatus.

In the display apparatuses 101, 102, 103 and 104 of another embodiment, configurations that are same as or similar to those of the display apparatus 100 have same terms and reference numbers, and detailed descriptions will be omitted to prevent redundancy.

As illustrated in FIG. 14, one of a plurality of display apparatuses 101, 102, 103 and 104 forming an overall display, for example, a first display apparatus 101 includes a signal receiver 110 which receives a signal from an image source 200. Also, in another embodiment, one of the plurality of display apparatuses 101, 102, 103 and 104 forming the overall display, for example, the first display apparatus 101 may include a sensor 150 and an information obtaining part 160. Also, a storage 170 of one of the plurality of display apparatuses 101, 102, 103 and 104 may store a look-up table which includes image quality information for areas, and a processor 180 of one of the plurality of display apparatuses 101, 102, 103 and 104 may perform operations of the processor in the embodiments above.

Although FIG. 14 illustrates an example where the first display apparatus 101 has the signal receiver 110, the sensor 150 and the information obtaining part 160, the disclosure is not limited thereto. That is, another of the display apparatuses 102, 103 and 104 has the configurations, and the signal receiver 110, the sensor 150 and the information obtaining part 160 may be individually provided at the display apparatuses that are different from one another.

The screens of the overall display formed by the display apparatuses 101, 102, 103 and 104 of the embodiment are divided into a plurality of areas as illustrated in FIG. 13 in response to the viewing angle of the user who watches the screens. Here, the number and size (width/height) of the divided areas of the screens are not limited to the example illustrated in FIG. 13.

In another embodiment, the processor 180 receives a signal where the sensor 150 senses at least one of the screen direction or the inclination of the display apparatuses 101, 102, 103 and 104, and determines the at least one of the screen direction or the inclination of the display apparatuses 101, 102, 103 and 104 in response to the received signal. Here, the processor 180 determines the screen direction or the inclination of one of the plurality of display apparatuses 101, 102, 103 and 104 as the screen direction or the inclination of the overall display.

The processor 180 compensates the image quality of the plurality of areas of the screen of each display apparatus 101, 102, 103 or 104 based on the sensed at least one of the screen direction or the inclination. In a case of the processor 180 being provided at the first display apparatus 101, the processor 180 performs the image quality compensation for each area of the screens of the overall display by outputting an image signal regarding the image quality compensation to a neighboring display apparatus 102 for the areas of the screens of other display apparatuses 102, 103 and 104.

Also, the processor 180 obtains the information on the viewing position of a plurality of users by the information obtaining part 160 and identifies the viewing position on which the distribution is concentrated based on the obtained information. Based on at least one of a distance between the identified viewing position and the display apparatuses 101, 102, 103 and 104 or the viewing angle of the user who watches the screen at the identified viewing position, the processor 180 determines an area for the image quality compensation among the plurality of areas of the screens of the display apparatuses 101, 102, 103 and 104.

Also, the processor 180 compensates the image quality of the area of the overall display formed by the display apparatuses 101, 102, 103 and 104 by reading the image quality information corresponding to the area for the image quality compensation from the look-up table of the storage 170 and adjusting the image signal according to the read setting information.

Accordingly, although the large display of a video wall type is embodied by the plurality of display apparatuses 101, 102, 103 and 104 of the embodiment, it is possible to compensate the image quality in consideration of the viewing angle for areas of the screen according to the screen direction and the inclination of the display apparatuses 101, 102, 103 and 104. Also, even though the large display of the video wall type is embodied by the plurality of display apparatuses 101, 102, 103 and 104, it is possible to compensate the image quality deterioration due to the viewing angle based on the position where a number of users gather at a public place.

Although the exemplary embodiments have been described, the disclosure is not limited thereto and the scope of which is defined in the appended claims.

The invention claimed is:

1. A display apparatus comprising:
   a display;
   at least one sensor;
   an information obtaining part;
   a storage; and
   a processor configured to:
   sense a direction of a screen corresponding to one of a vertical direction and a horizontal direction of the display by the at least one sensor,
   identify a plurality of areas of the screen divided in the vertical direction or the horizontal direction corresponding to the direction of the screen,
   obtain information on a plurality of viewing positions respectively corresponding to a plurality of user groups for the screen of the display by the information obtaining part,
   identify a viewing position corresponding to a predetermined user group, on which a distribution of users is concentrated, among the plurality of viewing positions respectively corresponding to the plurality of user groups based on the obtained information,
   identify an area corresponding to the identified viewing position among the plurality of areas of the screen, in which image quality deterioration due to a viewing angle at the identified viewing position occurs, the identified area corresponding to an edge of the screen, and
   compensate an image quality of the identified area corresponding to the identified viewing position among the plurality of areas of the screen based on information on image quality compensation corresponding to the image quality deterioration stored in the storage.

2. The display apparatus according to claim 1, wherein the plurality of areas of the screen is divided according to the viewing angle.

3. The display apparatus according to claim 1, wherein the processor is further configured to identify the area corresponding to the identified viewing position based on at least one of a distance between the identified viewing position and the display apparatus or the viewing angle at the identified viewing position.

4. The display apparatus according to claim 1, wherein the storage is configured to store a look-up table including the information on image quality compensation,
   wherein the processor is further configured to:
   read the information on the area corresponding to the identified viewing position from the look-up table, and
   compensate the image quality of the identified area corresponding to the identified viewing position based on the read information.

5. The display apparatus according to claim 4, wherein the information on image quality compensation corresponds to a setting value for at least one of luminance, color gamut, gamma, white balance, sharpness or contrast.

6. The display apparatus according to claim 1,
   wherein the processor is further configured to:
   sense an inclination of the display based on a sensing result of the at least one sensor, and
   compensate the image quality of the area corresponding to the identified viewing position based on the inclination of the display.

7. The display apparatus according to claim 6, wherein the storage is configured to store a look-up table including the information on image quality compensation,
   wherein the processor is further configured to:
   read the information on the area corresponding to the identified the inclination of the display from the look-up table, and
   compensate the image quality of the area corresponding to the identified viewing position based on the read information.

8. The display apparatus according to claim 1, wherein the information on the plurality of viewing positions respectively corresponding to the plurality of user groups includes an image obtained by at least one of a camera provided in the display apparatus or an external camera.

9. The display apparatus according to claim 8, wherein the information on the plurality of viewing positions respectively corresponding to the plurality of user groups includes data received from an external apparatus.

10. A method of controlling a display apparatus, the method comprising:
    sensing a direction of a screen corresponding to one of a vertical direction and a horizontal direction of a display of the display apparatus by at least one sensor;
    identifying a plurality of areas of the screen divided in the vertical direction or the horizontal direction corresponding to the direction of the screen;
    obtaining information on a plurality of viewing positions respectively corresponding to a plurality of user groups regarding the screen of the display;
    identifying a viewing position corresponding to a predetermined user group, on which a distribution of users is concentrated, among the plurality of viewing positions respectively corresponding to the plurality of user groups based on the obtained information,
    identifying an area corresponding to the identified viewing position among the plurality of areas of the screen, in which image quality deterioration due to a viewing angle at the identified viewing position occurs, the identified area corresponding to an edge of the screen, and
    compensating an image quality of the identified area corresponding to the identified viewing position among the plurality of areas of the screen based on information on image quality compensation corresponding to the image quality deterioration stored in a storage.

11. The method according to claim 10, wherein the plurality of areas of the screen is divided according to the viewing angle.

12. The method according to claim 10, wherein the identifying the area comprises identifying the area corresponding to the identified viewing position based on at least one of a distance between the identified viewing position and the display apparatus or the viewing angle at the identified viewing position.

13. The method according to claim 10, further comprising:
    sensing an inclination of the display based on a sensing result of the sensor,
    wherein the compensating comprises compensating the image quality of the area corresponding to the identified viewing position based on the inclination of the display.

* * * * *